UNITED STATES PATENT OFFICE.

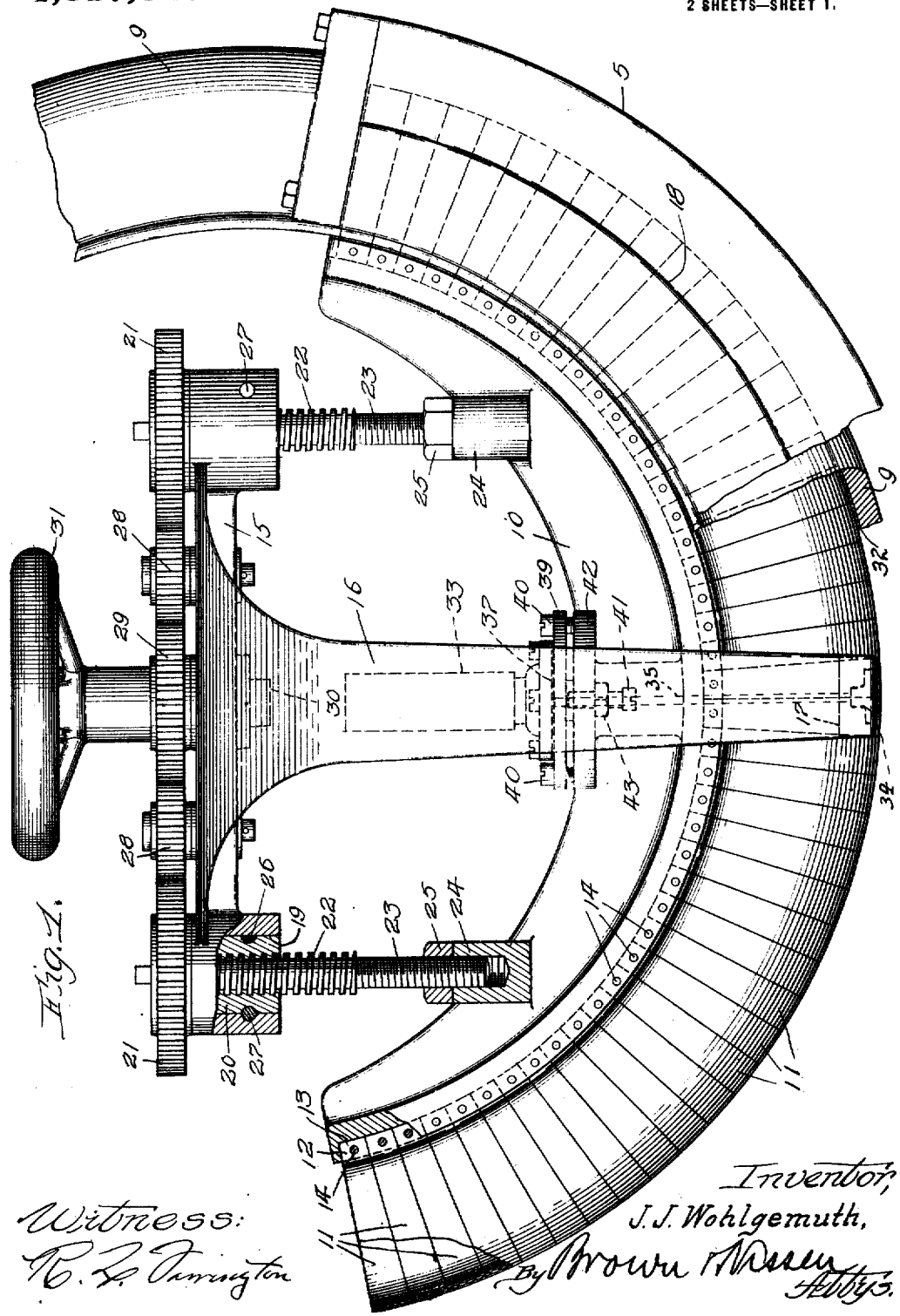

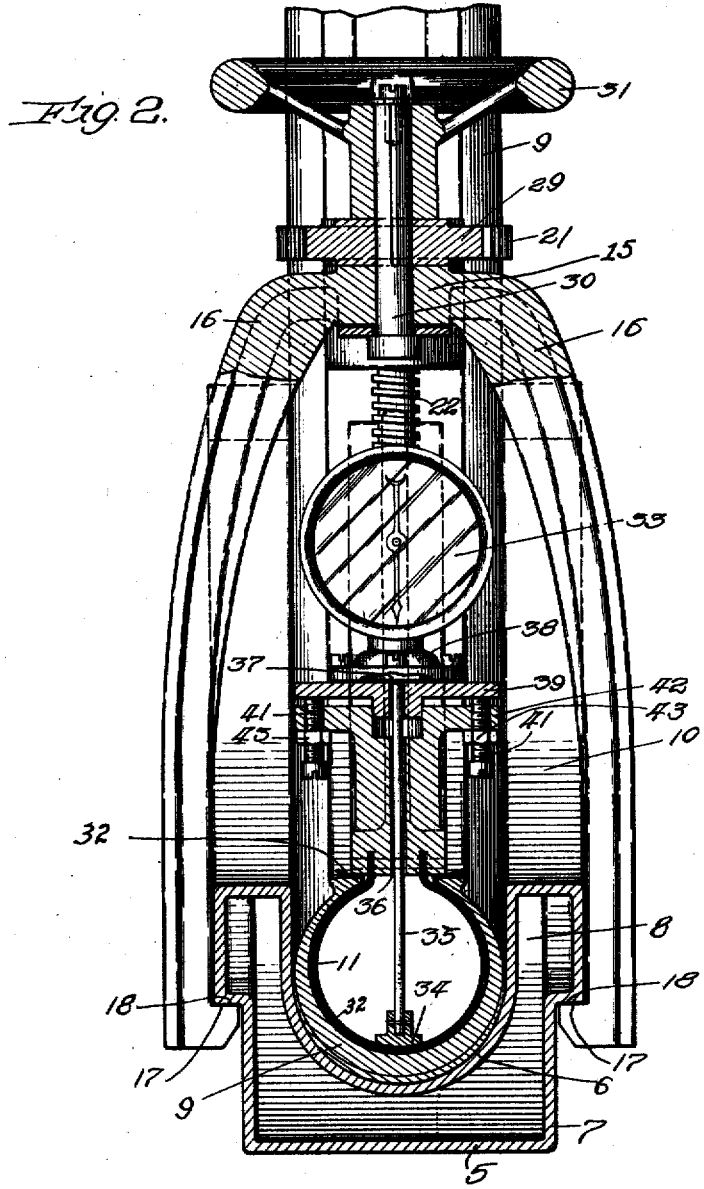

JACOB J. WOHLGEMUTH, OF CHICAGO, ILLINOIS.

TIRE-RETREADING PRESS.

1,317,848.     Specification of Letters Patent.     Patented Oct. 7, 1919.

Application filed October 11, 1918. Serial No. 257,725.

*To all whom it may concern:*

Be it known that I, JACOB J. WOHLGEMUTH, a citizen of the United States, and a resident of Chicago, in the county of Cook and State of Illinois, have invented certain new and useful Improvements in Tire-Retreading Presses, of which the following is a specification.

My invention relates to tire retreading presses, and has for its object the provision of simple and efficient means for imparting an even pressure to all parts of the tire under treatment.

A further object is the provision of a core member made up of a plurality of independent core parts with means for imparting pressure to said core members so that each of said core members operates independently of the other core members.

A still further object is the provision of means for indicating the pressure applied to the core members.

Other objects will appear hereinafter.

An embodiment of my invention is indicated in the accompanying drawings forming a part of this specification, and in which, Figure 1 is a side view of a retreading press with portions broken away to show underlying parts, and Fig. 2 is a central vertical section taken transversely through Fig. 1.

Referring more particularly to the drawings, I have indicated a vulcanizing mold 5 which consists of the mold wall 6 and a jacket 7 attached to the inner wall 6 with a space 8 between providing means for the admission of steam or other vulcanizing agent. The vulcanizing mold 6 is formed in such shape as to give the particular shape to a tire tread which may be desired. That is, the tread may be provided with smooth, as shown, or in any other configuration. I have indicated a portion of a tire 9 in the press so as to indicate its relation. The vulcanizing mold 5 may be of any preferred or ordinary construction; my invention has more particularly to do with a core and means for exerting pressure on the tire by such core.

In retreading presses of this nature the vulcanizing mold 5 incloses slightly more than one-third of the tire 9 so as to effectively retread about a third of such tire at one operation. The tire 9 is then moved around in the mold until a new section of such tire is retreaded.

I preferably provide a head member 10 which is substantially concentric with the tire mold 6 and to the outer surface of this head I secure or otherwise attach a plurality of spring members 11. The members 11 are preferably formed of flat spring material cut to the proper shape and formed circular with end portions 12 extending into grooves 13 in the head 10. The ends 12 may be secured to the head 10 in any desirable manner. I have indicated pins 14 as passing through the head 10 and ends 12. The members 11 are preferably formed in such shapes that there is substantially no space between them when assembled, as indicated in Fig. 1, so that their outer surfaces will engage the entire inner surface of the tire 9 during the retreading process.

In order to exert proper pressure on the head 10 and the core members 11, I preferably provide a clamp body 15 which has two arms 16 attached thereto with their outer ends having shoulders 17 engaging shoulders 18 on the wall 7 of the mold 5. The body 15 is provided with cylindrical openings 19 in its end portions and in said openings are mounted the hubs 20 of gears 21. The hubs of the gears 21 are threaded onto screws 22 which are attached to the head 10 in any desirable manner. I have indicated, as a suitable connection, the screws 22 having threads 23 thereon fitted in lugs 24 on the head 10. The screw parts 23 are provided with lock nuts 25 to prevent retrograde movement of the screw members. It will be apparent with this construction that by loosening the lock nuts 25 the threads 23 may be adjusted farther into or out of the lugs 24 so as to increase or decrease the relative lengths of the screws 22 so as to cause even pressures on the springs 11 if desired, or so that the springs at one end of head 10 may have greater presure than the other end if so desired. The hubs 20 are each provided with a peripheral groove 26 and pins 27 are passed through suitable openings in the ends of body 15 and grooves 26 to prevent displacement of the hubs 20 in the perforations 19. The gears 21 each mesh with an idler 28 and these idlers mesh with a gear 29 mounted on a shaft 30 and a hand wheel 31 is secured on the shaft 30 so that by manual operation of the hand wheel 31 the screws 22 are moved simultaneously to bodily move the head 10 toward the tire mold 6 and exert substantially equal pressure on all of the springs 11.

I prefer to use a plurality of independent springs 11 secured to the head 10 in the manner above mentioned, but it will be apparent that other forms of resilient or yieldable members may be used for cores and the head 10 exert pressure on said yieldable or resilient members to obtain proper pressures on the inside of the casing during retreading the tire 9. It is desirable to provide a piece of material 32 between the springs 11 and the tire 9 so as to prevent any tendency of the springs to mar the inner surface of the tire 9. The material of member 32 may be canvas or a flexible metal, or any desirable substance; it should be yielding so as to be easily handled.

In order to be able to know the amount of pressure exerted by the springs 11 on the inner side of tire 9, I preferably provide a gage 33 connected in a suitable manner to certain of the springs so as to indicate the pressure applied to such tire. Any suitable connection may be provided between the gage 33 and the springs 11. In the form shown a small block 34 engages one or more of the springs 11 and a pin 35 extends upwardly from said block through a suitable opening 36 in the head 10 and engages a diaphragm 37 at its upper end. The diaphragm 37 is connected to the bottom of the frame 38 of the gage 33. The gage 33 is of conventional construction and the portions thereof are not here shown. In order to adjust the pin 35 so that it engages the diaphragm 37 in a proper adjustment, I preferably provide a plate 39 which has two sets of screws 40 and 41. The screws 40 pass through the plate 39 and are threaded in an enlargement 42 on the head 10 and the screws 41 are threaded in the enlargement 42 and engage the underside of the plate 39. I also provide lock nuts 43 on the screws 41 so as to prevent retrograde movement of said screws. It will be apparent that by loosening the screws 40 and tightening the screws 41, the member 39 and diaphragm 37 will be moved away from the end of pin 35, and by loosening screws 41 and tightening screws 40, the member 39 and diaphragm 37 will be moved toward the end of pin 35. By this means proper adjustment may be made for the proper operation of the connection between the gage 33 and the springs 11. No graduations are shown on the gage 33, but it will be apparent that any form of graduations may be provided and that such graduations will correspond to the pressure exerted by springs 11 on the member 34 and pin 35 so that upon adjusting the screws 22 and flexing the springs 11, the gage 33 may indicate the pounds per square inch of pressure exerted on the inner side of tire 9, and also the tread surface of such tire 9.

I claim:

1. In combination, a tire mold; a core head adjacent said tire mold; a plurality of spring core members attached to said core head; and an adjustable connection between the tire mold and core head for exerting pressure on the latter in said mold.

2. In combination, a tire mold; a head substantially concentric with said mold; resilient core members on said head and extending into the tire mold; and an adjustable connection between the tire mold and said head.

3. In combination, a tire mold having shoulders thereon; a clamp body; arms on the clamp body engaging said shoulders; a substantially rigid head; a screw connection between the clamp body and said rigid head adapted to move said head toward said tire mold; and a plurality of resilient core members attached to said head and extending into said tire mold.

4. In combination, a tire mold; a head adjacent said tire mold; a clamp member connected with the tire mold; means for moving said head bodily away from said clamp member; and resilient core members on the head extending into the tire mold.

5. In combination, a tire mold; an elongated head substantially concentric with said tire mold; a plurality of resilient core members on the head and extending into said mold; a clamp body connected with said tire mold; a plurality of screws connecting said head and said clamp body; and means for moving all of said screws simultaneously.

6. In combination, a tire mold; a head substantially concentric with the tire mold; a plurality of spring core members on the head and extending into the mold; a clamp head connected with the tire mold; a plurality of screws attached to said head and extending through the clamp body; a gear threaded on each of said screws; and a connection between said gears for rotating the latter simultaneously.

7. In combination, a tire mold; a head substantially concentric with the tire mold; a plurality of independent spring core members attached to said head and extending into the mold; a clamp head; arms attached to said clamp head and engaging said tire mold; a plurality of screws attached to said head and extending through said clamp body; and gears threaded on said screws and connected together for simultaneous movement.

8. In combination, a tire mold; a head substantially concentric with the tire mold; a plurality of yieldable core members on said head and extending into said mold; an adjustable connection between said head and the tire mold; a pressure gage on said head; and a connection between certain of the yieldable core members and said gage for operating the latter upon yielding of said yieldable members.

9. In combination, a tire mold; a head adjacent the tire mold; a plurality of spring core members attached to said head and extending into the tire mold; a pressure gage on said head; and a rod connected with certain of said spring core members and said gage adapted to operate the latter upon flexing of said springs.

10. In combination, a tire mold; an elongated head substantially concentric with the tire mold; a plurality of spring core members disposed side by side along said head and extending into said tire mold; an adjustable connection between said head and said tire mold adapted to move said head bodily toward the tire mold; a gage on said head; and a connection between certain of the springs and said gage adapted to operate said gage to register the pressure on said springs upon flexing of said springs.

11. In a tire retreading press, the combination of a head member; a yielding core member; a diaphragm adjustably mounted on said head member; a gage mounted on and operable by said diaphragm; and a pusher member connected with the diaphragm and yielding core member.

12. In a tire retreading press, the combination of a head member; a yielding core member attached to said head member; a gage; and an adjustable connection between the gage and the yielding core member.

13. In combination, a tire mold; a core comprising a plurality of curved springs attached together and disposed in said mold providing a tire space between said core and said mold; and a clamp engaging said mold and adapted to exert force on said core to press a tire disposed in the mold into close contact with the latter.

14. In a mechanism of the class described, the combination of a main mold member forming mold chamber walls; a core located in the mold chamber and comprising in its construction a series of curved springs forming resilient sectional peripheral core portions, adapted to admit a tire between said core and said mold chamber walls; and means for pressing the core into engagement with such tire and into position to cause the resilient spring members of the core to be held at a tension tending to press outward against the tire on opposite sides of the longitudinal center of the core.

15. In a device of the class described, a core comprising in its construction a connecting member and a series of curved springs secured to said connecting member and forming resilient sectional core portions adapted to admit a tire between said core and the mold chamber walls, and means exerting pressure to cause the core to press the tire against the mold chamber walls.

16. In a device of the class described, a core comprising in its construction a rigid inner member and a series of curved springs secured to said inner member and forming resilient sectional core portions adapted to admit a tire between said core and the mold chamber walls, means exerting pressure to cause the core to press the tire against the mold walls, and pressure indicator mechanism for indicating the pressure applied.

17. In combination, a tire core comprising a plurality of sheet metal springs with each spring disposed in loop form, and means adapted to compress a tire against said spring core.

In testimony whereof I have signed my name to this specification on this 9th day of October, A. D. 1918.

JACOB J. WOHLGEMUTH.

Copies of this patent may be obtained for five cents each, by addressing the "Commissioner of Patents, Washington, D. C."